United States Patent
Kuribayashi (10) Patent No.: US 11,968,455 B2
(45) Date of Patent: Apr. 23, 2024

(54) SHAKE CORRECTION DEVICE, IMAGING APPARATUS, SHAKE CORRECTION METHOD, AND SHAKE CORRECTION PROGRAM

(71) Applicant: FUJIFILM Corporation, Tokyo (JP)

(72) Inventor: Kosuke Kuribayashi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/933,790

(22) Filed: Sep. 20, 2022

(65) Prior Publication Data

US 2023/0114299 A1 Apr. 13, 2023

(30) Foreign Application Priority Data

Sep. 30, 2021 (JP) ................... 2021-162019

(51) Int. Cl.
*H04N 23/68* (2023.01)

(52) U.S. Cl.
CPC ....... *H04N 23/687* (2023.01); *H04N 23/6815* (2023.01); *H04N 23/684* (2023.01)

(58) Field of Classification Search
CPC . H04N 23/687; H04N 23/6815; H04N 23/684
See application file for complete search history.

(56) References Cited

U.S. PATENT DOCUMENTS

2011/0102612 A1 5/2011 Iwata
2019/0215454 A1* 7/2019 Kimura ............... H04N 23/633

FOREIGN PATENT DOCUMENTS

JP 2009-267872 A 11/2009
JP 2012-004818 A 1/2012

* cited by examiner

*Primary Examiner* — Twyler L Haskins
*Assistant Examiner* — Fayez A Bhuiyan
(74) *Attorney, Agent, or Firm* — Studebaker & Brackett PC (57) ABSTRACT

A digital camera includes a vibration detector, an imaging element shift mechanism that corrects a shake of an image captured by an imaging element, and a system control unit, in which the system control unit performs a first control of driving the imaging element shift mechanism based on vibration information output from the vibration detector, and in a case where it is determined to be in a first state based on the vibration information, predicts the vibration information (angular velocity) output from the vibration detector at a timing of finish of the first state.

17 Claims, 9 Drawing Sheets

SHAKE CORRECTION DEVICE, IMAGING APPARATUS, SHAKE CORRECTION METHOD, AND SHAKE CORRECTION PROGRAM

CROSS-REFERENCE TO RELATED APPLICATIONS

This application is based upon and claims the benefit of priority from prior Japanese patent application No. 2021-162019, filed on Sep. 30, 2021, the entire contents of which are incorporated herein by reference.

BACKGROUND OF THE INVENTION

1. Field of the Invention

The present invention relates to a shake correction device, an imaging apparatus, a shake correction method, and a computer readable medium storing a shake correction program.

2. Description of the Related Art

JP2009-267872A discloses a vibration correction control circuit that corrects deviation of an optical axis caused by vibration exerted on an imaging apparatus. This circuit comprises an integration circuit that generates a movement amount signal indicating a movement amount of the imaging apparatus by integrating an acceleration signal output from a vibration detection element which detects the vibration, and a control unit that determines whether or not the imaging apparatus is in a panning state or a tilting state. The integration circuit is configured with a digital filter. This digital filter includes a register that holds an integrated value to be used as an amplitude value of the movement amount signal. In a case where it is determined that the imaging apparatus is in the panning state or the tilting state, the control unit decreases an absolute value of the integrated value held in the register.

JP2012-004818A discloses a correction control device comprising an imaging control unit that divides a plurality of pixels arranged on an imaging element into a plurality of groups, reads out a still picture signal from a pixel belonging to each group in units of divided group, and further reads out a motion picture signal from a pixel belonging to each group in units of divided groups during a period of reading out the still picture signal in units of divided groups, a camera shake detection unit that detects a motion of the imaging apparatus comprising the imaging element, and a camera shake correction unit that operates a correction mechanism for correcting the motion based on the motion detected by the camera shake detection unit. In this device, in a case where a period of reading out the still picture signal for generating one still image is defined as a still picture cycle period, the camera shake correction unit performs a centering operation of moving the correction mechanism to a reference position within a centering operation available period that is a period obtained by excluding at least a period of reading out the motion picture signal from the still picture cycle period.

SUMMARY OF THE INVENTION

A shake correction device according to one embodiment of the disclosed technology comprises a vibration detector, a shake correction mechanism that corrects a shake of an image captured by an imaging element, and a processor, in which the processor is configured to perform a first control of driving the shake correction mechanism based on vibration information output from the vibration detector, and in a case where it is determined to be in a first state based on the vibration information, predict the vibration information to be output from the vibration detector at a timing of finish of the first state.

A shake correction device according to another embodiment of the disclosed technology comprises a vibration detector, a shake correction mechanism that corrects a shake of an image captured by an imaging element, and a processor, in which the processor is configured to perform a first control of driving the shake correction mechanism based on vibration information output from the vibration detector, and in a case where it is determined to be in a first state based on the vibration information, hold a position of a movable unit of the shake correction mechanism at a position based on the first state at at least a timing of finish of the first state.

A shake correction method according to still another embodiment of the disclosed technology comprises performing a first control of driving a shake correction mechanism that corrects a shake of an image captured by an imaging element based on vibration information output from a vibration detector, and predicting, in a case where it is determined to be in a first state based on the vibration information, the vibration information to be output from the vibration detector at a timing of finish of the first state.

A shake correction method according to still another embodiment of the disclosed technology comprises performing a first control of driving a shake correction mechanism that corrects a shake of an image captured by an imaging element based on vibration information output from a vibration detector, and holding, in a case where it is determined to be in a first state based on the vibration information, a position of a movable unit of the shake correction mechanism at a position based on the first state at at least a timing of finish of the first state.

A shake correction program stored in a non-transitory computer readable medium according to still another embodiment of the disclosed technology causes a processor to execute performing a first control of driving a shake correction mechanism that corrects a shake of an image captured by an imaging element based on vibration information output from a vibration detector, and predicting, in a case where it is determined to be in a first state based on the vibration information, the vibration information to be output from the vibration detector at a timing of finish of the first state.

A shake correction program stored in a non-transitory computer readable medium according to still another embodiment of the disclosed technology causes a processor to execute performing a first control of driving a shake correction mechanism that corrects a shake of an image captured by an imaging element based on vibration information output from a vibration detector, and holding, in a case where it is determined to be in a first state based on the vibration information, a position of a movable unit of the shake correction mechanism at a position based on the first state at at least a timing of finish of the first state.

DESCRIPTION OF THE PREFERRED EMBODIMENTS

Figure 1:
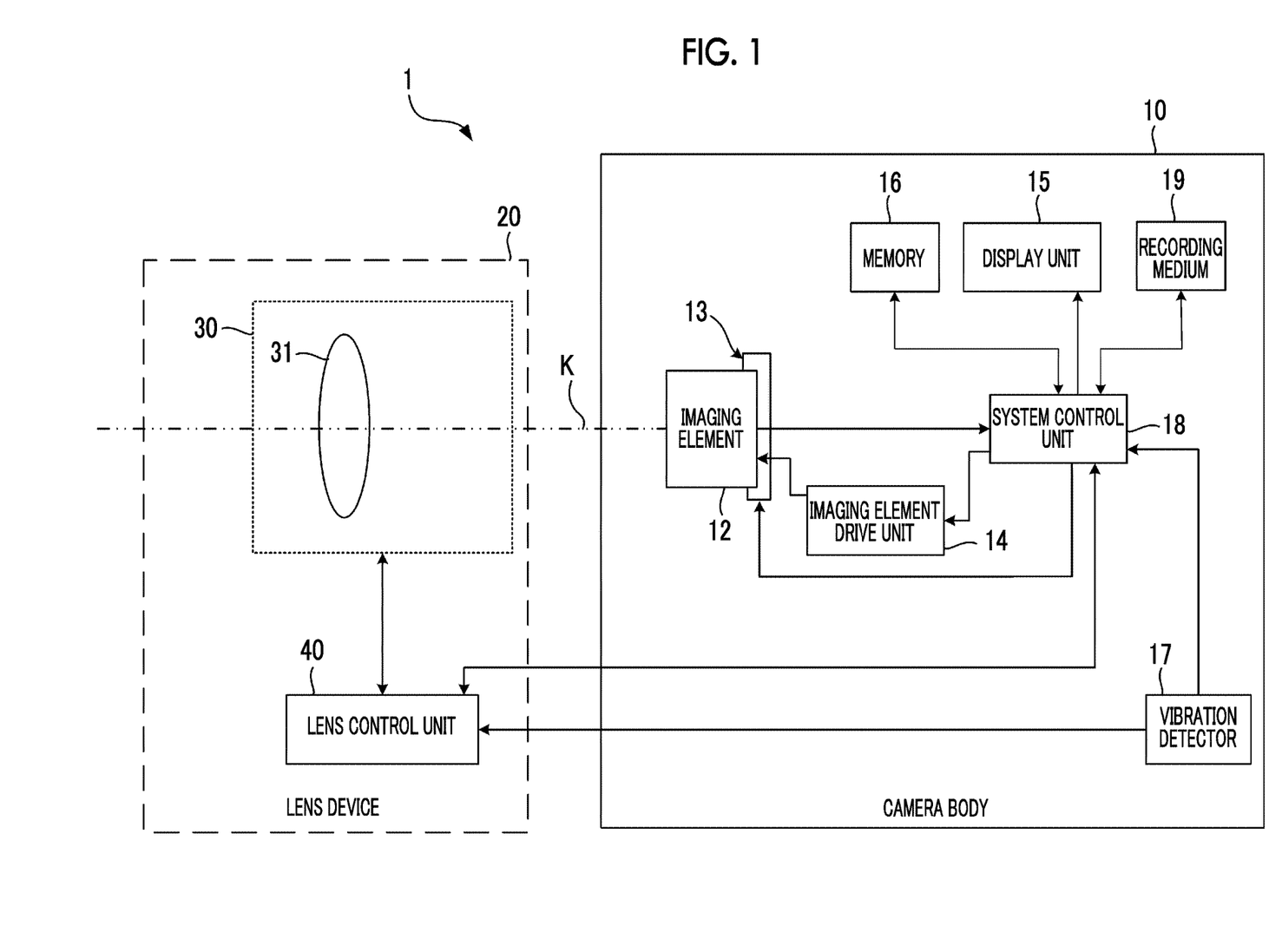
FIG. 1 is a diagram illustrating a schematic configuration of a digital camera 1 that is one embodiment of an imaging apparatus according to the present invention.

FIG. 1 is a diagram illustrating a schematic configuration of a digital camera 1 that is one embodiment of an imaging apparatus according to the present invention. The digital camera 1 comprises a camera body 10 and a lens device 20. The lens device 20 is attachably and detachably, in other words, interchangeably, configured with respect to the camera body 10. The lens device 20 may be integrated with the camera body 10.

The lens device 20 includes an imaging optical system 30 and a lens control unit 40. The imaging optical system 30 comprises an imaging lens 31 and a stop mechanism and the like, not illustrated. For example, the imaging lens 31 is composed of a single lens or a plurality of lenses including a lens for adjusting a focal point of the imaging optical system 30. The lens control unit 40 is mainly configured with a processor and controls driving of the imaging optical system 30 under control of a system control unit 18, described later.

The camera body 10 comprises an imaging element 12, an imaging element shift mechanism 13 constituting a shake correction mechanism, an imaging element drive unit 14, a display unit 15 that is a display device such as a liquid crystal display or an organic electro luminescence (EL) device, a memory 16 including a random access memory (RAM) as a volatile memory in which information is temporarily recorded, a read only memory (ROM) as a non-volatile memory in which a program and various information necessary for an operation of the program are recorded in advance, and the like, a vibration detector 17, the system control unit 18, and a recording medium 19 such as a memory card configured with a non-volatile memory.

The imaging element 12 images a subject through the imaging optical system 30. The imaging element 12 is configured with a charge coupled device (CCD) image sensor, a complementary metal oxide semiconductor (CMOS) image sensor, or the like. The imaging element 12 includes a light-receiving region 120 (refer to FIG. 2) in which a plurality of pixels are two-dimensionally arranged.

The imaging element shift mechanism 13 is a mechanism for preventing a shake of a subject image formed in the light-receiving region 120 of the imaging element 12 by moving the imaging element 12 in a plane perpendicular to an optical axis K of the imaging optical system 30.

The vibration detector 17 is a sensor for detecting a motion of the digital camera 1. The vibration detector 17 is configured with, for example, an acceleration sensor or an angular velocity sensor or both thereof. The vibration detector 17 may be disposed in the lens device 20. Hereinafter, the vibration detector 17 will be described as an angular velocity sensor.

The system control unit 18 manages and controls the entire digital camera 1. A hardware structure of the system control unit 18 corresponds to various processors that perform processing by executing programs including a shake correction program.

The various processors include a central processing unit (CPU) that is a general-purpose processor performing various types of processing by executing a program, a programmable logic device (PLD) that is a processor of which a circuit configuration can be changed after manufacturing like a field programmable gate array (FPGA), or a dedicated electric circuit that is a processor having a circuit configuration dedicatedly designed to execute a specific type of processing like an application specific integrated circuit (ASIC). More specifically, a structure of the various processors is an electric circuit in which circuit elements such as semiconductor elements are combined. The system control unit 18 may be configured with one of the various processors or may be configured with a combination of two or more processors of the same type or different types (for example, a combination of a plurality of FPGAs or a combination of a CPU and an FPGA).

The system control unit 18 causes the imaging element 12 to image the subject by controlling the imaging element drive unit 14 and outputs a captured image signal corresponding to the subject image formed in the light-receiving region 120 of the imaging element 12 from the imaging element 12. The system control unit 18 generates an image of a format such as Joint Photographic Experts Group (JPEG) format reproducible by the digital camera 1 or another apparatus by performing image processing on the captured image signal output from the light-receiving region 120 of the imaging element 12.

In imaging the subject by the imaging element 12, the system control unit 18 corrects a shake (image shake) of the image captured by the imaging element 12 by controlling the imaging element shift mechanism 13 based on vibration information (specifically, an angular velocity) of the digital camera 1 detected by the vibration detector 17. The system control unit 18, the vibration detector 17, and the imaging element shift mechanism 13 constitute a shake correction device.

Figure 2:
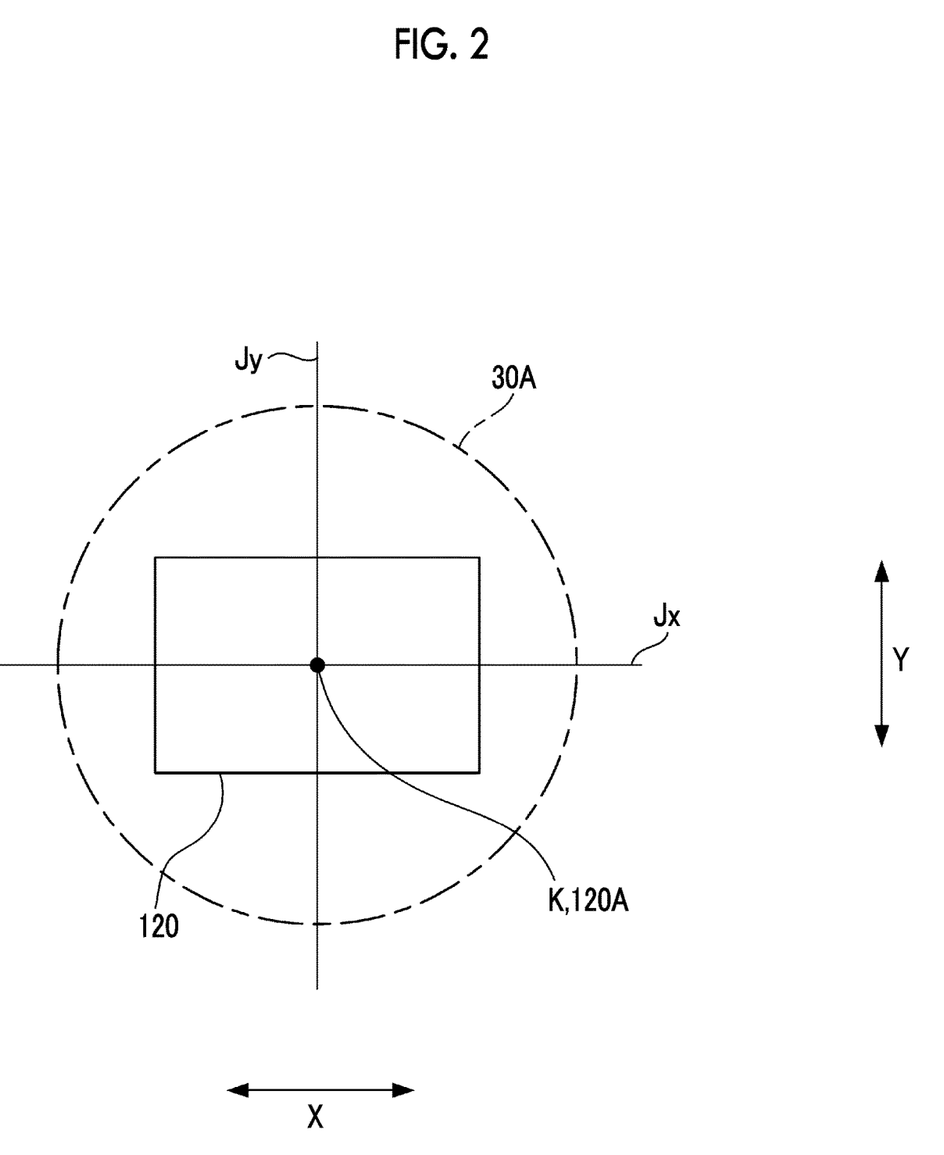
FIG. 2 is a schematic diagram for describing a movable range of an imaging element 12 by an imaging element shift mechanism 13.

FIG. 2 is a schematic diagram for describing a movable range of the imaging element 12 by the imaging element shift mechanism 13. In FIG. 2, the optical axis K of the imaging optical system 30, an image circle 30A centered at the optical axis K, and an axis Jx and an axis Jy that are orthogonal at the optical axis K as an origin are illustrated. The axis Jx is an axis that extends in a direction (row direction X) in which a long side of the light-receiving region 120 extends. The axis Jy is an axis that extends in a direction (column direction Y) in which a short side of the light-receiving region 120 extends. A plane including the axis Jx and the axis Jy will be referred to as an XY plane. The imaging element 12 is moved in the XY plane by the imaging element shift mechanism 13 within a range in which the entire light-receiving region 120 falls within the image circle 30A. For example, the imaging element shift mechanism 13 includes a movable unit that is driven by an actuator such as a voice coil motor. The imaging element 12 is fixed to the movable unit. Accordingly, hereinafter, a position of the imaging element 12 in the XY plane (hereinafter, simply referred to as the position of the imaging element 12) will be considered to be the same as a position of the movable unit of the imaging element shift mechanism 13 in the XY plane.

A reference position is determined for the position of the imaging element 12. The reference position is a position at which the imaging element 12 is held in a case where there is no motion of the digital camera 1. In the example in FIG. 2, the position of the imaging element 12 at which a center 120A of the light-receiving region 120 matches the optical axis K is the reference position. The reference position does not need to be a position at which the center 120A matches the optical axis K. For example, a position at which the center 120A is present slightly away from the optical axis K may be the reference position. By setting the reference position near the optical axis K, a movable range of the imaging element 12 in correcting the image shake by moving the imaging element 12 based on the reference position as a starting point can be increased, and correction performance of the image shake can be increased. The reference position constitutes a first position.

The system control unit 18 performs a first control of performing high-pass filter processing on the angular velocity output from the vibration detector 17, deriving a movement direction and a movement amount of the imaging element 12 for offsetting the motion of the digital camera 1 based on the integrated value of the angular velocity after the high-pass filter processing, and moving the imaging element 12 by the movement amount in the movement direction.

In a state where the angular velocity (absolute value) output from the vibration detector 17 is large, a first state where an angle of view is significantly moved by the motion of the digital camera 1, and a second state where the digital camera 1 is slightly vibrating are possible. Specifically, the first state is a state during a predetermined operation such as a pan operation, a tilt operation, a translation operation of the digital camera 1, or an operation in which the digital camera 1 mounted on a movement apparatus moves. The system control unit 18 determines that it is in the second state in a case where a period of change (period from a rise to a fall) in the angular velocity output from the vibration detector 17 is less than or equal to a threshold value, and determines that it is in the first state in a case where the period of change exceeds the threshold value. In the second state, after the first control of moving the imaging element 12 based on the angular velocity after the high-pass filter processing is performed, the system control unit 18 performs a second control (hereinafter, referred to as a centering control) of moving the imaging element 12 toward the reference position. On the other hand, in a case where it is determined to be in the first state, after the first control of moving the imaging element 12 based on the angular velocity after the high-pass filter processing is performed, the system control unit 18 stops the centering control until a timing of finish of the first state. The "timing of the finish of the first state" refers to a time period of any part or the entire period of a period from when the angular velocity starts to fall to when the angular velocity becomes zero after it is determined to be in the first state.

Figure 3:
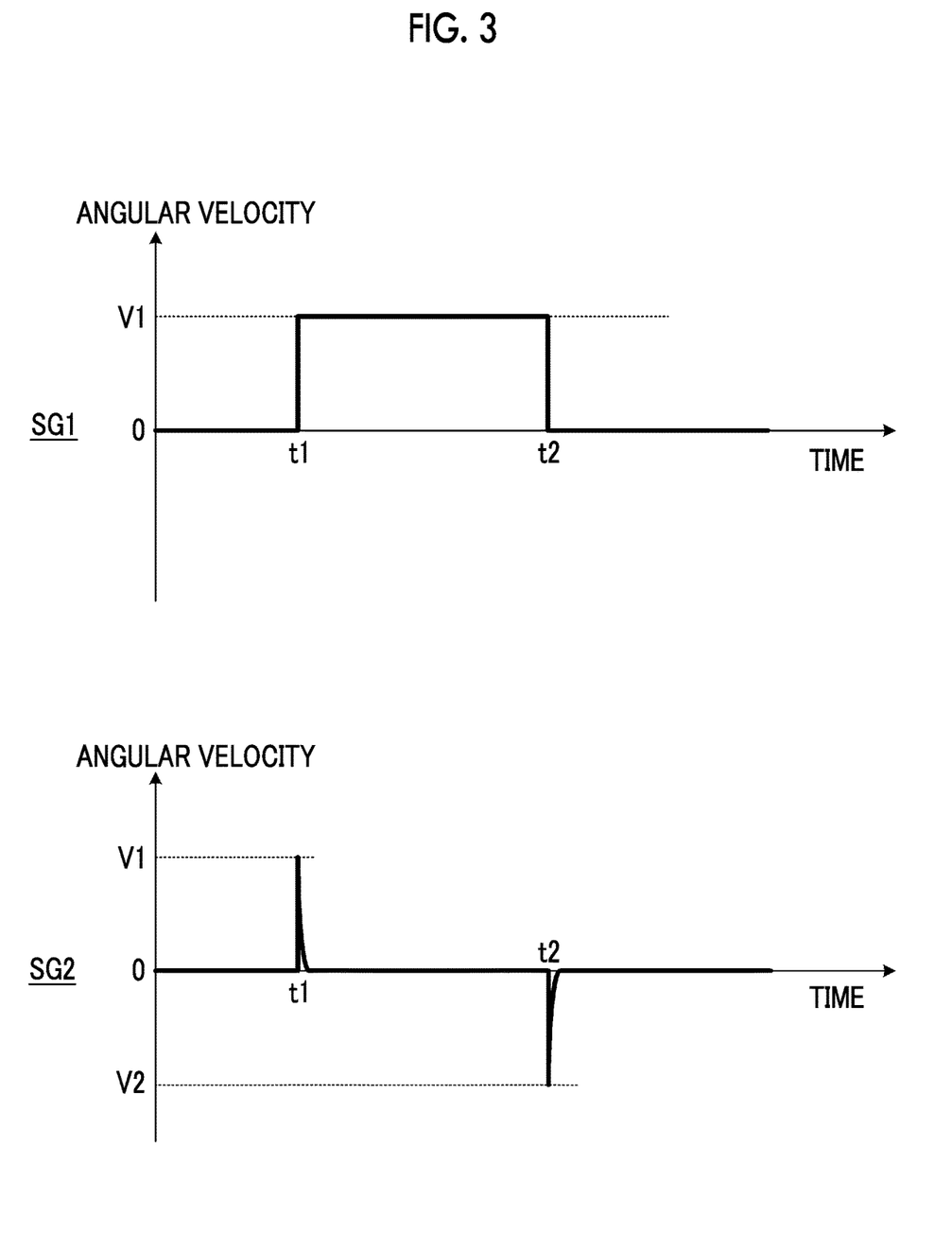
FIG. 3 is a diagram illustrating an example of an output of a vibration detector 17 in a case where a pan operation or a tilt operation is performed.

FIG. 3 is a diagram illustrating an example of the output of the vibration detector 17 in a case where the pan operation or the tilt operation is performed. A signal SG1 illustrated in FIG. 3 shows the angular velocity output from the vibration detector 17. A signal SG2 illustrated in FIG. 3 shows a state after the high-pass filter processing of the signal SG1. In the example in FIG. 3, the pan operation or the tilt operation is started at time point t1, and the pan operation or the tilt operation is finished at time point t2. As shown in the signal SG2, the angular velocity after the high-pass filter processing is a positive angular velocity V1 at time point t1 and is a negative angular velocity V2 at time point t2. Both of the signal SG1 and the signal SG2 constitute the vibration information.

In a case where the angular velocity V1 is detected at time point t1, the system control unit 18 performs the first control of moving the imaging element 12 based on the angular velocity V1. Then, in a case where exceeding of the threshold value by the period of change in the angular velocity that rises at time point t1 is detected, the system control unit 18 determines that it is in the first state and predicts an angular velocity V2a after the high-pass filter processing at a timing (timing of the finish of the first state) of finish of the period of change. The prediction of the angular velocity V2a can be performed using a function that is experimentally obtained. For example, the angular velocity V2a is predicted using a linear function (y=ax+b) in which a variable x is a value (for example, the angular velocity V1 in FIG. 3) of the angular velocity at a start of the period of change in the angular velocity, and a and b are experimentally determined coefficients.

After the angular velocity V2a is predicted, the system control unit 18 holds the position of the imaging element 12 at at least the timing of the finish of the period of change in the angular velocity so that the position of the imaging element 12 is a position based on the angular velocity V2a. The angular velocity V2a is predicted based on an initial velocity (angular velocity V1 in FIG. 3) of the angular velocity occurring at a start of the first state. Thus, the "position based on the angular velocity V2a" can also be a position based on the first state.

In the period of change in the angular velocity, a change in the angular velocity corresponding to slight vibration of the digital camera 1 may also occur. In a case where such a change occurs, the system control unit 18 further moves the imaging element 12 from the position to which the imaging element 12 is moved by the first control at time point t1 in order to correct an image shake caused by the vibration. In a case where the first control is further performed after time point t1 before time point t2, the system control unit 18 moves the imaging element 12 to the position based on the angular velocity V2a and holds the imaging element 12 after the first control is finished. In a case where the first control is not performed after time point t1 before time point t2, the position of the imaging element 12 is held at the position based on the angular velocity V2a during a period from after the prediction of the angular velocity V2a to time point t2.

Holding the position of the imaging element 12 refers to deciding a target position and controlling the imaging element 12 to maintain the target position unless the first control is performed. In a case where the finish of the period of change is detected at time point t2, the system control unit 18 performs the first control of moving the imaging element 12 based on the angular velocity (actually measured angular velocity V2) output from the vibration detector 17.

Figure 4:
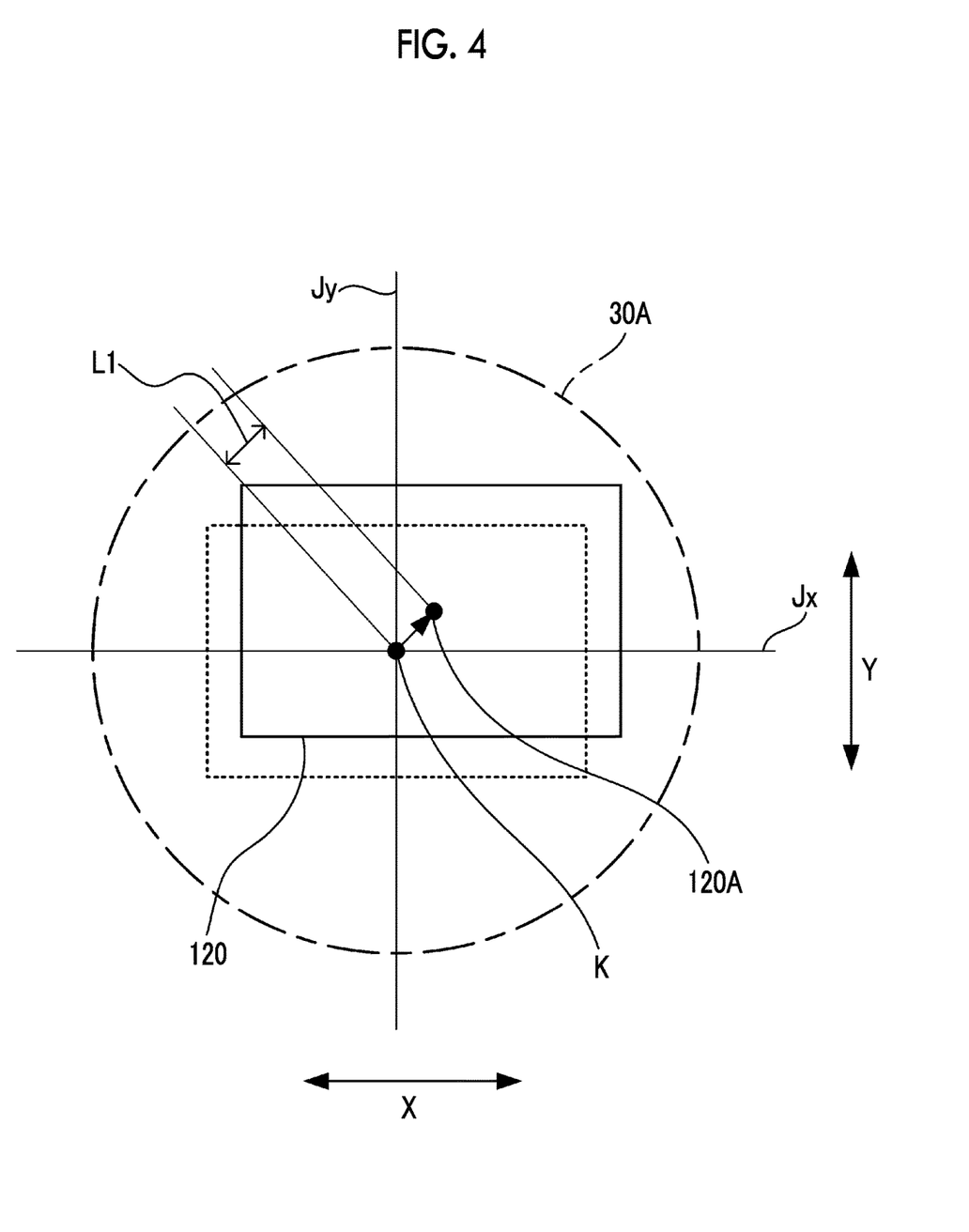
FIG. 4 is a schematic diagram illustrating a state where the imaging element 12 is moved from a reference position based on an angular velocity V1 detected at time point t1 in FIG. 3.

FIG. 4 is a schematic diagram illustrating a state where the imaging element 12 is moved from the reference position based on the angular velocity V1 detected at time point t1 in FIG. 3. The imaging element 12 is moving in an upper right direction of FIG. 4 from the reference position by a distance L1 based on the angular velocity V1. The predicted angular velocity V2a has an opposite sign to the angular velocity V1. Thus, in a case where the first control of moving the imaging element 12 from the state illustrated in FIG. 4 based on the angular velocity V2a is performed, the position of the imaging element 12 returns toward the reference position. Hereinafter, a movement distance that is in a direction of the reference position of the imaging element 12 and is determined based on the angular velocity V2a will be referred to as a first movement distance L2. The system control unit 18 determines the position of the imaging element 12 to be held during the period until time point t2 based on the first movement distance L2 and the reference position.

Figure 5:
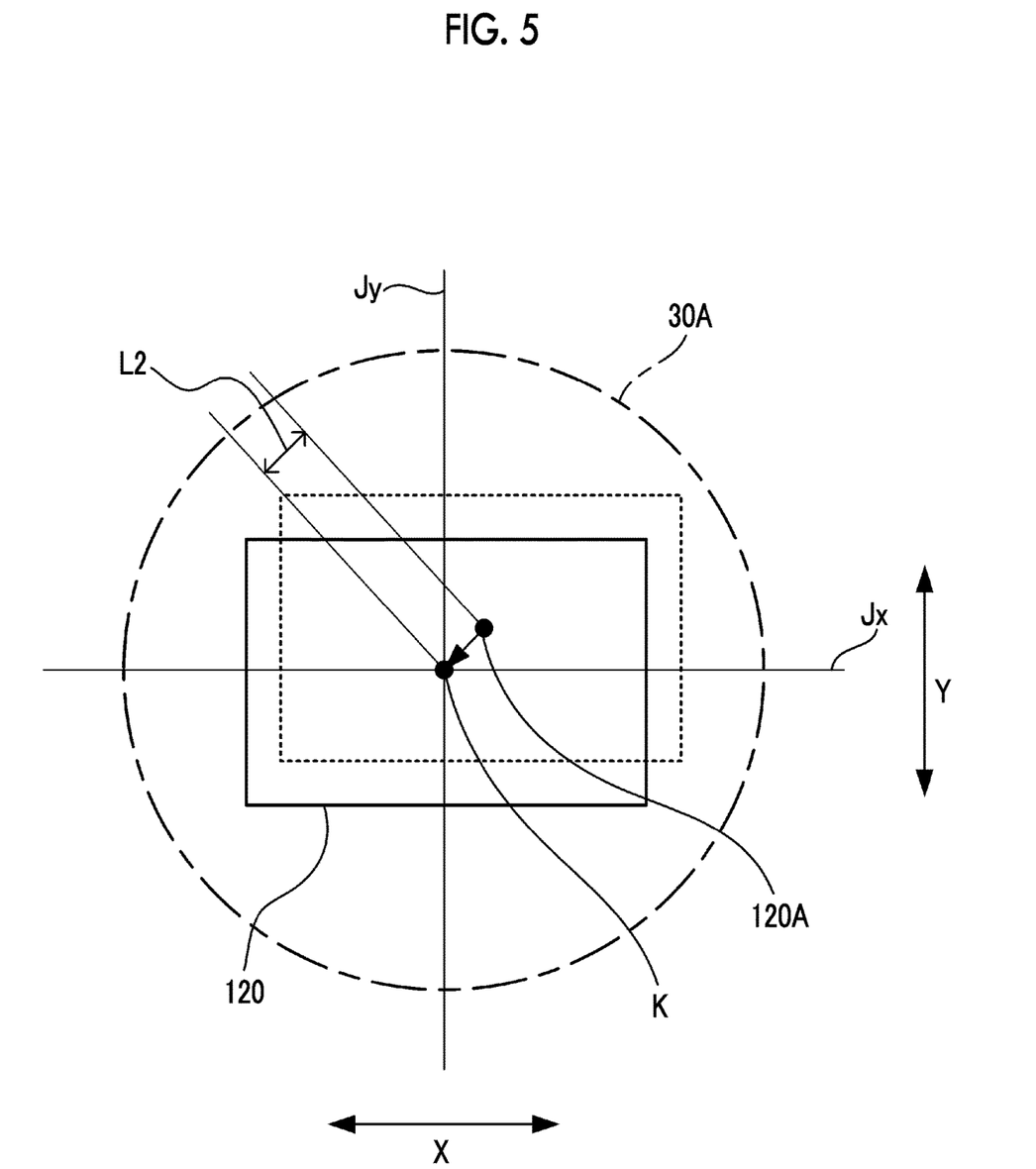
FIG. 5 is a schematic diagram illustrating a state where the imaging element 12 is moved from the state in FIG. 4 based on an angular velocity V2 detected at time point t2 in FIG. 3.

Specifically, in a case where the position of the imaging element 12 reaches the reference position by moving the imaging element 12 in the direction (direction opposite to the movement direction of the imaging element 12 by the first control performed based on the angular velocity V1) of the reference position by the first movement distance L2 from the state in FIG. 4 (that is, in a case of L2=L1), the system control unit 18 holds the position of the imaging element 12 at the position illustrated in FIG. 4 until time point t2. In a case where it is assumed that the predicted angular velocity V2a matches the actual angular velocity V2, the position of the imaging element 12 moves in the direction of the reference position by the first movement distance L2 based on the actually measured angular velocity V2 in a case where time point t2 is reached. Thus, as illustrated in FIG. 5, the position of the imaging element 12 returns to the reference position along with the finish of the first state.

Figure 6:
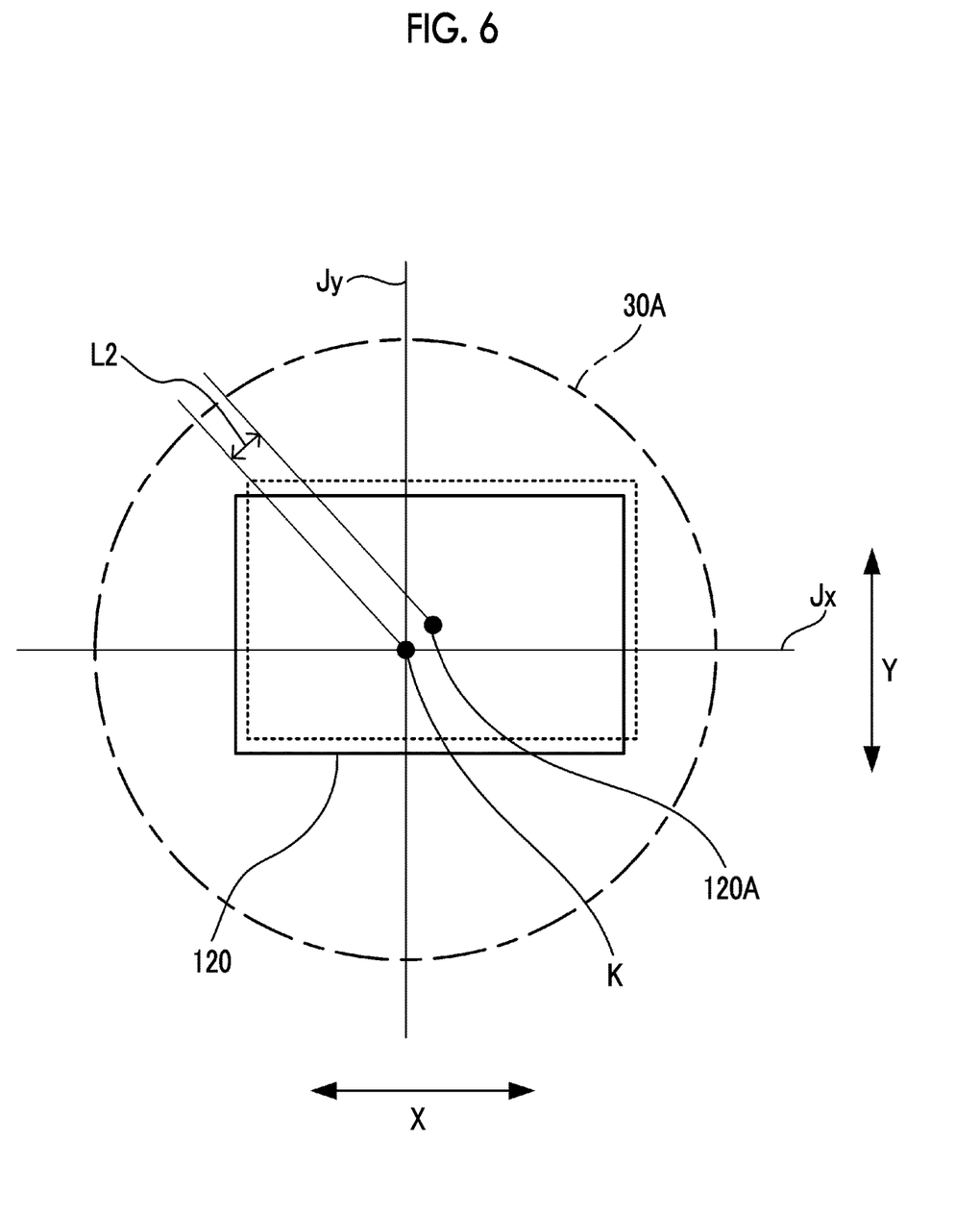
FIG. 6 is a schematic diagram illustrating a state where the imaging element 12 is moved close to the reference position from the state in FIG. 4.

In addition, in a case where the position of the imaging element 12 does not reach the reference position by moving the imaging element 12 in the direction of the reference position by the first movement distance L2 from the state in FIG. 4 (in a case of L2<L1), as illustrated in FIG. 6, the system control unit 18 holds the position of the imaging element 12 at a position (position at which a distance from the reference position is the first movement distance L2) closer to the reference position than the position (position illustrated by a broken line in FIG. 6) illustrated in FIG. 4 until time point t2. In a case where it is assumed that the angular velocity V2a matches the angular velocity V2, the position of the imaging element 12 moves in the direction of the reference position by the first movement distance L2 based on the actually measured angular velocity V2 in a case where time point t2 is reached. Thus, the position of the imaging element 12 returns to the reference position along with the finish of the first state.

Figure 7:
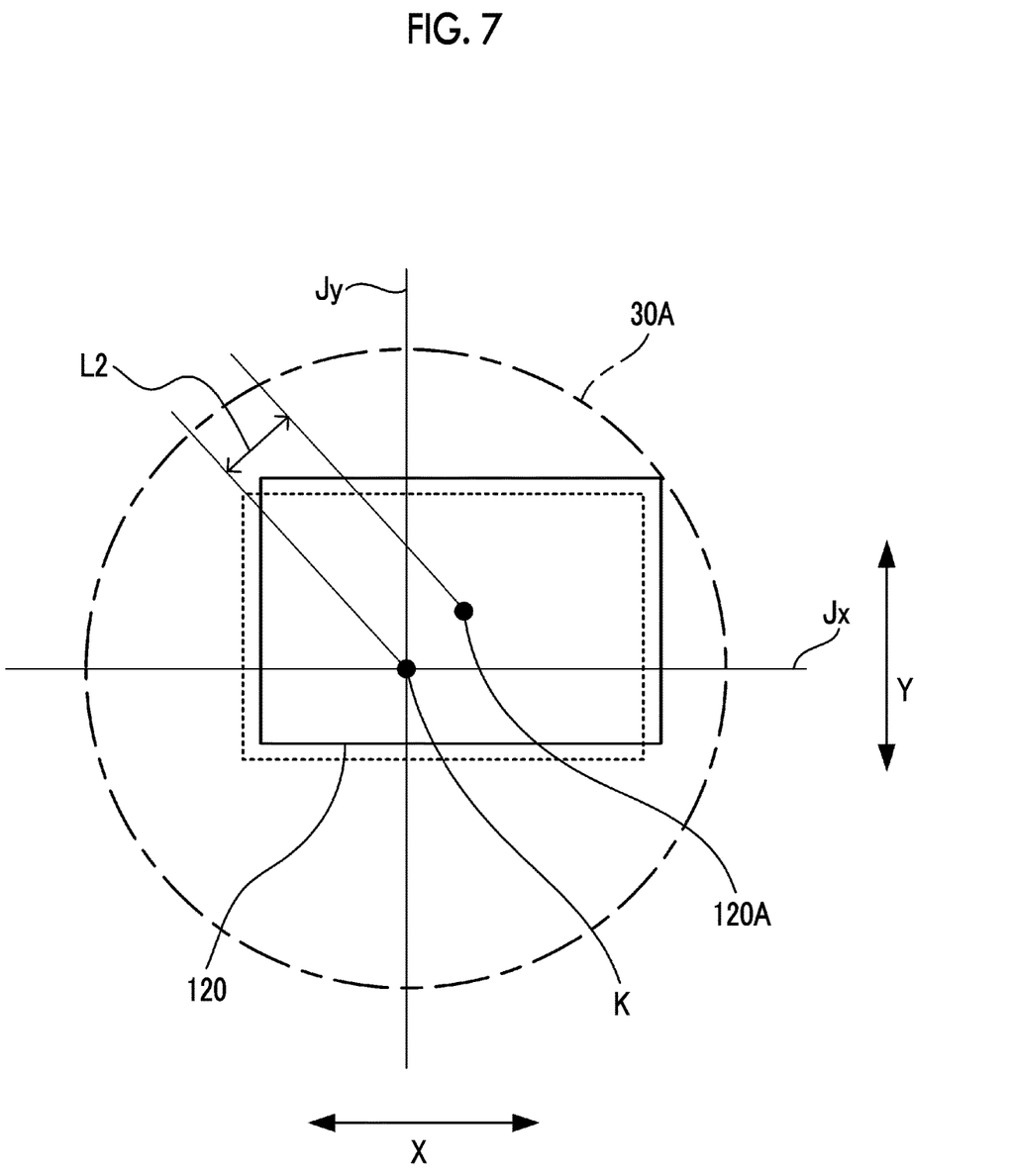
FIG. 7 is a schematic diagram illustrating a state where the imaging element 12 is moved away from the reference position from the state in FIG. 4.

In addition, in a case where the position of the imaging element 12 passes through the reference position by moving the imaging element 12 in the direction of the reference position by the first movement distance L2 from the state in FIG. 4 (in a case of L2>L1), as illustrated in FIG. 7, the system control unit 18 holds the position of the imaging element 12 at a position (position at which a distance from the reference position is the first movement distance L2) further away from the reference position than the position (position illustrated by a broken line in FIG. 7) illustrated in FIG. 4 until time point t2. In a case where it is assumed that the angular velocity V2a matches the angular velocity V2, the position of the imaging element 12 moves in the direction of the reference position by the first movement distance L2 based on the actually measured angular velocity V2 in a case where time point t2 is reached. Thus, the position of the imaging element 12 returns to the reference position along with the finish of the first state.

In a case where the position of the imaging element 12 passes through the reference position by moving the imaging element 12 in the direction of the reference position by the first movement distance L2 from the state in FIG. 4 (in a case of L2>L1), the system control unit 18 may hold the position of the imaging element 12 at the position illustrated in FIG. 4 and decrease correction sensitivity of the shake of the image by the imaging element shift mechanism 13 in the first control executed at time point t2 below the correction sensitivity in the first control executed at a timing other than time point t2, until time point t2. Decreasing the correction sensitivity refers to setting the movement amount of the imaging element 12 determined in accordance with an angle that is the integrated value of the angular velocity to be smaller than in a case where the correction sensitivity is a reference value (value in the first control executed at a timing other than time point t2). Doing so can move the imaging element 12 in the direction of the reference position by a distance shorter than the first movement distance L2 based on the actually measured angular velocity V2 in a case where time point t2 is reached. Consequently, the position of the imaging element 12 can return to the reference position along with the finish of the first state.

As described above, according to the digital camera 1, the centering control (second control) is stopped in the first state that is a state during the predetermined operation such as the pan operation or the tilt operation. Thus, a change in the image caused by a significant movement of the imaging element 12 by the imaging element shift mechanism 13 can be suppressed. In addition, by stopping the centering control, the image shake caused by slight vibration of the digital camera 1 occurring in the first state can be corrected by performing the first control, and quality of the captured image can be improved. In addition, in a case where the first state is finished, the imaging element 12 is moved based on the angular velocity (angular velocity V2 in FIG. 3) occurring by the finish of the first state. However, after it is determined to be in the first state, the position of the imaging element 12 is held at the position (position illustrated in FIG. 4, FIG. 6, or FIG. 7) based on the angular velocity V2a predicted to occur at a time of the finish of the first state. Thus, in a case where the first state is finished, the position of the imaging element 12 can return to or near the reference position. Consequently, the movable range of the imaging element 12 in performing the first control after the digital camera 1 is brought to a standstill can be increased, and the correction performance of the image shake can be increased.

The movement of the imaging element 12 along with the finish of the first state is performed at almost the same time as when the digital camera 1 is brought to a standstill by finishing the pan operation, the tilt operation, or the like. Thus, a user is unlikely to perceive a change in the image caused by the movement of the imaging element 12. Accordingly, the imaging element 12 can be brought close to the reference position without making the user feel weird.

Next, a configuration of a smartphone that is another embodiment of the imaging apparatus according to the present invention will be described.

Figure 8:
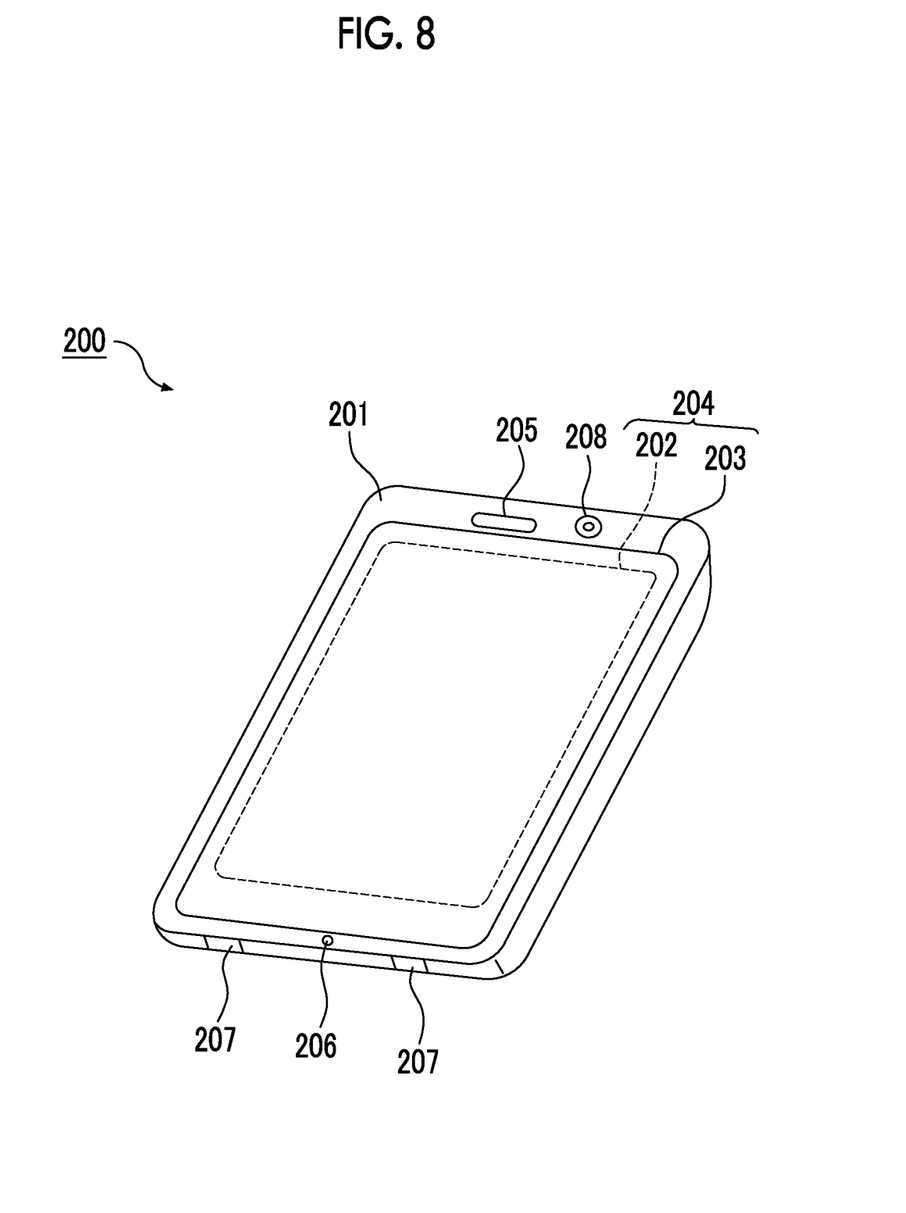
FIG. 8 illustrates an exterior of a smartphone 200.

FIG. 8 illustrates an exterior of a smartphone 200. The smartphone 200 illustrated in FIG. 8 includes a casing 201 having a flat plate shape and comprises a display and input unit 204 in which a display panel 202 as a display unit and an operation panel 203 as an input unit are integrated on one surface of the casing 201.

The casing 201 comprises a speaker 205, a microphone 206, an operation unit 207, and a camera unit 208. The configuration of the casing 201 is not for limitation and may employ, for example, a configuration in which the display unit and the input unit are independently disposed, or a configuration that has a folded structure or a sliding mechanism.

Figure 9:
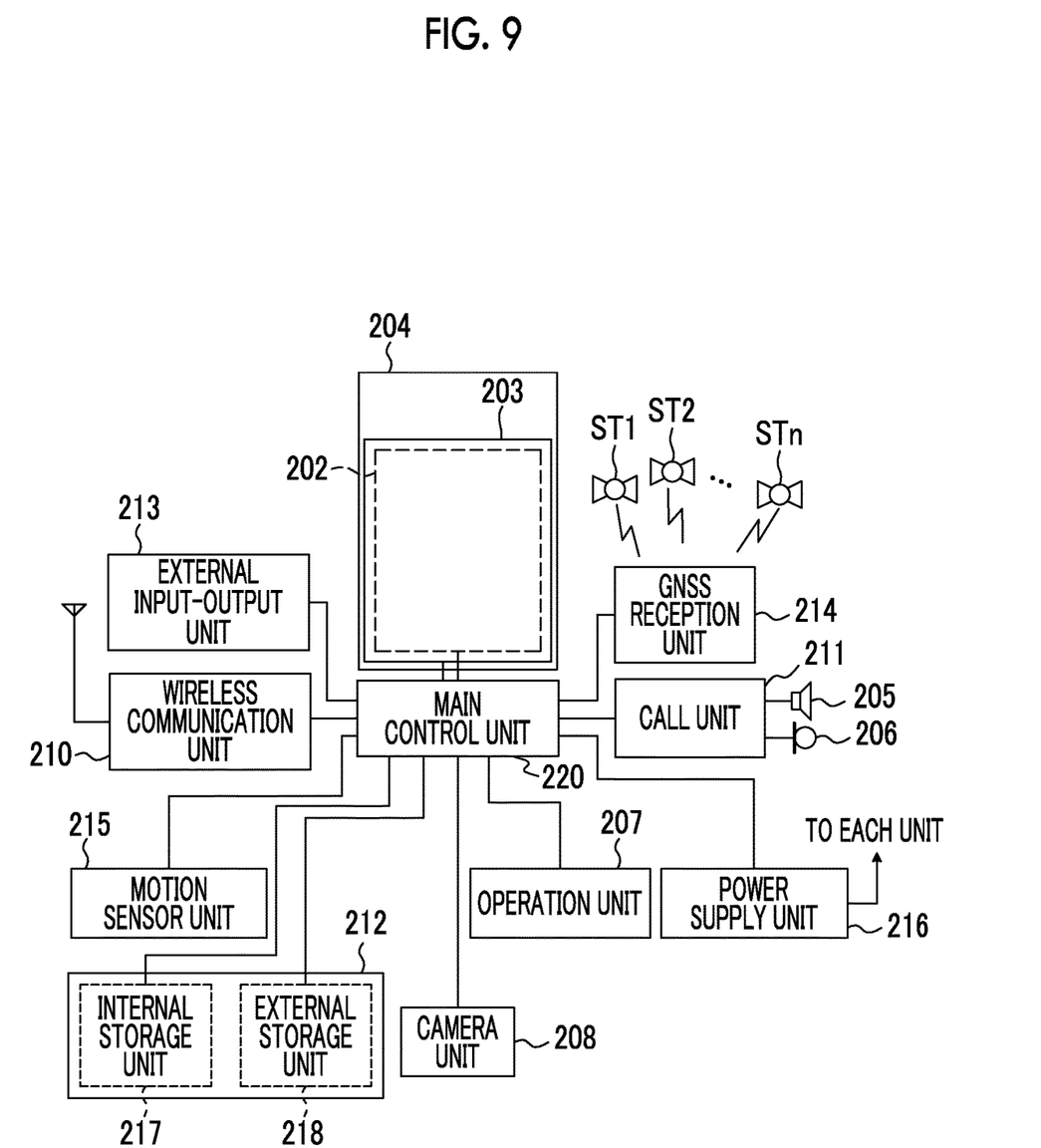
FIG. 9 is a block diagram illustrating a configuration of the smartphone 200 illustrated in FIG. 8.

FIG. 9 is a block diagram illustrating a configuration of the smartphone 200 illustrated in FIG. 8.

As illustrated in FIG. 9, a wireless communication unit 210, the display and input unit 204, a call unit 211, the operation unit 207, the camera unit 208, a storage unit 212, an external input-output unit 213, a global navigation satellite system (GNSS) reception unit 214, a motion sensor unit 215, a power supply unit 216, and a main control unit 220 are comprised as main constituents of the smartphone.

In addition, a wireless communication function of performing mobile wireless communication with a base station apparatus BS, not illustrated, through a mobile communication network NW, not illustrated, is provided as a main function of the smartphone 200.

The wireless communication unit 210 performs wireless communication with the base station apparatus BS accommodated in the mobile communication network NW in accordance with an instruction from the main control unit 220. By using the wireless communication, transmission and reception of various file data such as voice data and image data, electronic mail data, or the like and reception of web data, streaming data, or the like are performed.

The display and input unit 204 is a so-called touch panel that visually delivers information to the user by displaying images (still images and motion images), text information, or the like and detects a user operation with respect to the displayed information under control of the main control unit 220. The display and input unit 204 comprises the display panel 202 and the operation panel 203.

A liquid crystal display (LCD), an organic electro-luminescence display (OELD), or the like is used as a display device in the display panel 202.

The operation panel 203 is a device that is placed such that an image displayed on the display surface of the display panel 202 can be visually recognized, is operated by a finger of the user or a stylus, and detects one or a plurality of coordinates. In a case where the device is operated by the finger of the user or the stylus, a detection signal generated by the operation is output to the main control unit 220. Next, the main control unit 220 detects an operation position (coordinates) on the display panel 202 based on the received detection signal.

As illustrated in FIG. 9, the display panel 202 and the operation panel 203 of the smartphone 200 illustrated as the imaging apparatus according to one embodiment of the present invention are integrated and constitute the display and input unit 204. The operation panel 203 is arranged to completely cover the display panel 202.

In a case where such arrangement is employed, the operation panel 203 may have a function of detecting the user operation even in a region outside the display panel 202. In other words, the operation panel 203 may comprise a detection region (hereinafter, referred to as a display region) for an overlapping part in overlap with the display panel 202 and a detection region (hereinafter, referred to as a non-display region) for an edge part other than the overlapping part that is not in overlap with the display panel 202.

The size of the display region and the size of the display panel 202 may completely match, but both sizes do not need to match. In addition, the operation panel 203 may comprise two sensitive regions of the edge part and an inner part other than the edge part. Furthermore, the width of the edge part is appropriately designed depending on the size and the like of the casing 201.

Furthermore, as a position detection method employed in the operation panel 203, a matrix switch method, a resistive film method, a surface acoustic wave method, an infrared method, an electromagnetic induction method, an electrostatic capacitive method, and the like are exemplified, and any of the methods can be employed.

The call unit 211 comprises the speaker 205 or the microphone 206 and converts voice of the user input through the microphone 206 into voice data processable in the main control unit 220 and outputs the voice data to the main control unit 220, or decodes voice data received by the wireless communication unit 210 or the external input-output unit 213 and outputs the decoded voice data from the speaker 205.

In addition, as illustrated in FIG. 8, for example, the speaker 205 can be mounted on the same surface as a surface on which the display and input unit 204 is disposed, and the microphone 206 can be mounted on a side surface of the casing 201.

The operation unit 207 is a hardware key that uses a key switch or the like, and receives an instruction from the user. For example, as illustrated in FIG. 8, the operation unit 207 is a push-button type switch that is mounted on a side surface of the casing 201 of the smartphone 200 and enters an ON state in a case where the switch is pressed by the finger or the like, and enters an OFF state by restoring force of a spring or the like in a case where the finger is released.

The storage unit 212 stores a control program and control data of the main control unit 220, application software, address data in which a name, a telephone number, or the like of a communication counterpart is associated, transmitted and received electronic mail data, web data downloaded by web browsing, and downloaded contents data, and temporarily stores streaming data or the like. In addition, the storage unit 212 is configured with an internal storage unit 217 incorporated in the smartphone and an external storage unit 218 that includes a slot for an attachable and detachable external memory.

Each of the internal storage unit 217 and the external storage unit 218 constituting the storage unit 212 is implemented using a storage medium such as a memory (for example, a MicroSD (registered trademark) memory) of a flash memory type, a hard disk type, a multimedia card micro type, or a card type, a random access memory (RAM), or a read only memory (ROM).

The external input-output unit 213 is an interface with all external apparatuses connected to the smartphone 200 and is directly or indirectly connected to other external apparatuses by communication or the like (for example, Universal Serial Bus (USB), IEEE1394, Bluetooth (registered trademark), radio frequency identification (RFID), infrared communication (Infrared Data Association (IrDA) (registered trademark)), Ultra Wideband (UWB) (registered trademark), or ZigBee (registered trademark)) or through a network (for example, the Ethernet (registered trademark) or a wireless local area network (LAN)).

For example, the external apparatuses connected to the smartphone 200 include a wired/wireless headset, a wired/wireless external charger, a wired/wireless data port, a memory card and a subscriber identity module (SIM)/user identity module (UIM) card connected through a card socket, an external audio and video apparatus connected through an audio and video input/output (I/O) terminal, a wirelessly connected external audio and video apparatus, a smartphone connected in a wired/wireless manner, a personal computer connected in a wired/wireless manner, and an earphone.

The external input-output unit 213 can deliver data transferred from the external apparatuses to each constituent in the smartphone 200 or transfer data in the smartphone 200 to the external apparatuses.

The GNSS reception unit 214 receives GNSS signals transmitted from GNSS satellites ST1 to STn, executes a position measurement calculation process based on the received plurality of GNSS signals, and detects a position that includes a latitude, a longitude, and an altitude of the smartphone 200 in accordance with an instruction from the main control unit 220. In a case where positional information can be acquired from the wireless communication unit 210 or the external input-output unit 213 (for example, a wireless LAN), the GNSS reception unit 214 can detect the position using the positional information.

The motion sensor unit 215 comprises, for example, a three-axis acceleration sensor and detects a physical motion of the smartphone 200 in accordance with an instruction from the main control unit 220. By detecting the physical motion of the smartphone 200, a movement direction or an acceleration of the smartphone 200 is detected. The detection result is output to the main control unit 220.

The power supply unit 216 supplies power stored in a battery (not illustrated) to each unit of the smartphone 200 in accordance with an instruction from the main control unit 220.

The main control unit 220 comprises a microprocessor, operates in accordance with the control program and the control data stored in the storage unit 212, and manages and controls each unit of the smartphone 200. The microprocessor of the main control unit 220 has the same function as the system control unit 18. In addition, the main control unit 220 has a mobile communication control function of controlling each unit of a communication system and an application processing function for performing voice communication or data communication through the wireless communication unit 210.

The application processing function is implemented by operating the main control unit 220 in accordance with the application software stored in the storage unit 212. For example, the application processing function is an infrared communication function of performing data communication with an opposing apparatus by controlling the external input-output unit 213, an electronic mail function of transmitting and receiving electronic mails, or a web browsing function of browsing a web page.

In addition, the main control unit 220 has an image processing function such as displaying a video on the display and input unit 204 based on image data (data of a still image or a motion image) such as reception data or downloaded streaming data.

The image processing function refers to a function of causing the main control unit 220 to decode the image data, perform image processing on the decoding result, and display an image on the display and input unit 204.

Furthermore, the main control unit 220 executes display control for the display panel 202 and operation detection control for detecting the user operation through the operation unit 207 and the operation panel 203.

By executing the display control, the main control unit 220 displays an icon for starting the application software or a software key such as a scroll bar or displays a window for creating an electronic mail.

The scroll bar refers to a software key for receiving an instruction to move a display part of a large image or the like that does not fit in the display region of the display panel 202.

In addition, by executing the operation detection control, the main control unit 220 detects the user operation through the operation unit 207, receives an operation with respect to the icon and an input of a text string in an input field of the window through the operation panel 203, or receives a request for scrolling the display image through the scroll bar.

Furthermore, by executing the operation detection control, the main control unit 220 has a touch panel control function of determining whether the operation position on the operation panel 203 is in the overlapping part (display region) in overlap with the display panel 202 or the other edge part (non-display region) not in overlap with the display panel 202 and controlling the sensitive region of the operation panel 203 or a display position of the software key.

In addition, the main control unit 220 can detect a gesture operation with respect to the operation panel 203 and execute a preset function depending on the detected gesture operation.

The gesture operation is not a simple touch operation in the related art and means an operation of drawing a trajectory by the finger or the like, designating a plurality of positions at the same time, or drawing a trajectory for at least one of the plurality of positions as a combination thereof.

The camera unit 208 includes the lens device 20, the imaging element 12, the imaging element shift mechanism 13, the imaging element drive unit 14, and the vibration detector 17 illustrated in FIG. 1.

Captured image data generated by the camera unit 208 can be stored in the storage unit 212 or be output through the external input-output unit 213 or the wireless communication unit 210.

In the smartphone 200 illustrated in FIG. 9, the camera unit 208 is mounted on the same surface as the display and input unit 204. However, the mount position of the camera unit 208 is not for limitation purposes. The camera unit 208 may be mounted on a rear surface of the display and input unit 204.

In addition, the camera unit 208 can be used in various functions of the smartphone 200. For example, an image acquired by the camera unit 208 can be displayed on the display panel 202, or the image of the camera unit 208 can be used as one of operation inputs of the operation panel 203.

In addition, in a case where the GNSS reception unit 214 detects the position, the position can be detected by referring to the image from the camera unit 208. Furthermore, by referring to the image from the camera unit 208, an optical axis direction of the camera unit 208 of the smartphone 200 can be determined, or the current usage environment can be determined without using the three-axis acceleration sensor or using the three-axis acceleration sensor. The image from the camera unit 208 can also be used in the application software.

Besides, image data of a still image or a motion image to which the positional information acquired by the GNSS reception unit 214, voice information (may be text information acquired by performing voice to text conversion by the main control unit or the like) acquired by the microphone 206, attitude information acquired by the motion sensor unit 215, or the like is added can be stored in the storage unit 212 or be output through the external input-output unit 213 or the wireless communication unit 210.

Even in the smartphone 200 having the above configuration, an image of high quality can be provided by suppressing a change in the image during the predetermined operation or after the finish of the predetermined operation.

As described so far, the camera body 10 of the digital camera 1 corrects the image shake by moving the imaging element 12. Instead of moving the imaging element 12, the digital camera 1 may correct the image shake by moving a vibration-proof lens included in the imaging optical system 30 of the lens device 20. In this case, the above operation in which the imaging element 12 moves is simply replaced with an operation in which the vibration-proof lens moves.

As described above, at least the following matters are disclosed in the present specification.

(1) A shake correction device comprising a vibration detector, a shake correction mechanism that corrects a shake of an image captured by an imaging element, and a processor, in which the processor is configured to perform a first control of driving the shake correction mechanism based on vibration information output from the vibration detector, and in a case where it is determined to be in a first state based on the vibration information, predict the vibration information to be output from the vibration detector at a timing of finish of the first state.

According to (1), by predicting the vibration information at the timing of the finish of the first state, how far a movable unit of the shake correction mechanism moves from a position of movement by the first control at the timing can be estimated. Thus, for example, by adjusting a position of the movable unit so that the movable unit returns to a predetermined position in a case where the first control is performed at the timing of the finish of the first state, quality of the image captured by the imaging element can be improved by maintaining a motion of the movable unit to the minimum during the first state. In addition, after the first state is finished, the movable unit can return to the predetermined position by the first control. A movable range of the movable unit in subsequently performing the first control can be increased, and shake correction performance can be increased.

(2) The shake correction device according to (1), in which the processor is configured to perform a second control of moving a movable unit of the shake correction mechanism toward a first position.

(3) The shake correction device according to (2), in which the processor is configured to stop the second control in a case where it is determined to be in the first state.

(4) The shake correction device according to any one of (1) to (3), in which the first state is a state during a predetermined operation performed on the shake correction device.

(5) The shake correction device according to (4), in which the predetermined operation is a pan operation or a tilt operation for moving an angle of view imaged by the imaging element.

(6) The shake correction device according to any one of (1) to (5), in which the processor is configured to, in a case where it is determined to be in the first state after a start of the first control, hold a position of a movable unit of the shake correction mechanism at a position based on the predicted vibration information at at least the timing of the finish of the first state.

(7) The shake correction device according to (6), in which the processor is configured to determine the position for holding based on a first position and a first movement distance, the first movement distance being a movement distance of the movable unit in a case where the first control is performed based on the predicted vibration information.

(8) The shake correction device according to (7), in which the processor is configured to, in a case where the position of the movable unit does not reach the first position by moving the movable unit by the first movement distance, hold the position of the movable unit moved from the first position by the first control at a position closer to the first position than the position.

(9) The shake correction device according to (7) or (8), in which the processor is configured to, in a case where the position of the movable unit matches the first position by moving the movable unit by the first movement distance, hold the position of the movable unit moved from the first position by the first control at the position.

(10) The shake correction device according to any one of (7) to (9), in which the processor is configured to, in a case where the position of the movable unit passes through the first position by moving the movable unit by the first movement distance, hold the position of the movable unit that is moved from the first position by the first control at a position further away from the first position than the position.

(11) The shake correction device according to any one of (7) to (9), in which the processor is configured to, in a case where the position of the movable unit passes through the first position by moving the movable unit by the first movement distance, hold the position of the movable unit moved from the first position by the first control at the position and decrease correction sensitivity of the shake of the image by the shake correction mechanism in the first control executed at the timing of the finish of the first state below the correction sensitivity in the first control executed at a timing other than the timing of the finish of the first state.

(12) A shake correction device comprising a vibration detector, a shake correction mechanism that corrects a shake of an image captured by an imaging element, and a processor, in which the processor is configured to perform a first control of driving the shake correction mechanism based on vibration information output from the vibration detector, and in a case where it is determined to be in a first state based on the vibration information, hold a position of a movable unit of the shake correction mechanism at a position based on the first state at at least a timing of finish of the first state.

(13) An imaging apparatus comprising the shake correction device according to any one of (1) to (12), and the imaging element.

(14) A shake correction method comprising performing a first control of driving a shake correction mechanism that corrects a shake of an image captured by an imaging element based on vibration information output from a vibration detector, and predicting, in a case where it is determined to be in a first state based on the vibration information, the vibration information to be output from the vibration detector at a timing of finish of the first state.

(15) A shake correction method comprising performing a first control of driving a shake correction mechanism that corrects a shake of an image captured by an imaging element based on vibration information output from a vibration detector, and holding, in a case where it is determined to be in a first state based on the vibration information, a position of a movable unit of the shake correction mechanism at a position based on the first state at at least a timing of finish of the first state.

(16) A non-transitory computer readable medium storing a shake correction program causing a processor to execute a step of performing a first control of driving a shake correction mechanism that corrects a shake of an image captured by an imaging element based on vibration information output from a vibration detector, and predicting, in a case where it is determined to be in a first state based on the vibration information, the vibration information to be output from the vibration detector at a timing of finish of the first state.

(17) A non-transitory computer readable medium storing a shake correction program causing a processor to execute a step of performing a first control of driving a shake correction mechanism that corrects a shake of an image captured by an imaging element based on vibration information output from a vibration detector, and holding, in a case where it is determined to be in a first state based on the vibration information, a position of a movable unit of the shake correction mechanism at a position based on the first state at at least a timing of finish of the first state.

EXPLANATION OF REFERENCES

1: digital camera
10: camera body
12: imaging element
13: imaging element shift mechanism
14: imaging element drive unit
15: display unit
16: memory
17: vibration detector
18: system control unit
19: recording medium
20: lens device
30: imaging optical system
30A: image circle
31: imaging lens
40: lens control unit
120: light-receiving region
120A: center
Jx, Jy: axis
K: optical axis
L1: distance
L2: first movement distance
200: smartphone
201: casing
202: display panel
203: operation panel
204: display and input unit
205: speaker
206: microphone
208: camera unit
210: wireless communication unit
211: call unit
212: storage unit
213: external input-output unit
214: GNSS reception unit
215: motion sensor unit
216: power supply unit
217: internal storage unit
218: external storage unit
220: main control unit

What is claimed is:

1. A shake correction device comprising:
a vibration detector;
a shake correction mechanism that corrects a shake of an image captured by an imaging element; and
a processor,
wherein the processor is configured to
perform a first control of driving the shake correction mechanism based on vibration information output from the vibration detector, and
in response to a first state being detected based on the vibration information, predict the vibration information to be output from the vibration detector at a timing of finish of the first state, and
wherein the first state is a state where a period of change in angular velocity included in the vibration information output from the vibration detector exceeds a threshold value.

2. The shake correction device according to claim 1, wherein the processor is configured to perform a second control of moving a movable unit of the shake correction mechanism toward a first position.

3. The shake correction device according to claim 2, wherein the processor is configured to stop the second control in response to the first state being detected.

4. The shake correction device according to claim 1, wherein the first state is a state during a predetermined operation performed on the shake correction device.

5. The shake correction device according to claim 4, wherein the predetermined operation is a pan operation or a tilt operation for moving an angle of view imaged by the imaging element.

6. The shake correction device according to claim 1, wherein the processor is configured to, in response to the first state being detected after a start of the first control, hold a position of a movable unit of the shake correction mechanism at a holding position based on the predicted vibration information at at least the timing of the finish of the first state.

7. The shake correction device according to claim 6, wherein the processor is configured to determine the holding position based on a first position and a first movement distance, the first movement distance being a movement distance of the movable unit in response to the first control being performed based on the predicted vibration information.

8. The shake correction device according to claim 7, wherein the processor is configured to, in response to the position of the movable unit not reaching the first position by moving the movable unit by the first movement distance, hold the position of the movable unit at a position closer to the first position than the position of the movable unit that is moved from the first position by the first control.

9. The shake correction device according to claim 7, wherein the processor is configured to, in response to the position of the movable unit matching the first position by moving the movable unit by the first movement distance, hold the position of the movable unit at the position of the movable unit that is moved from the first position by the first control.

10. The shake correction device according to claim 7, wherein the processor is configured to, in response to the position of the movable unit passing through the first position by moving the movable unit by the first movement distance, hold the position of the movable unit at a position further away from the first position than the position of the movable unit that is moved from the first position by the first control.

11. The shake correction device according to claim 7, wherein the processor is configured to, in response to the position of the movable unit passing through the first position by moving the movable unit by the first movement distance, hold the position of the movable unit at the position of the movable unit that is moved from the first position by the first control and decrease correction sensitivity of the shake of the image by the shake correction mechanism in the first control performed at the timing of the finish of the first state below the correction sensitivity in the first control performed at a timing other than the timing of the finish of the first state.

12. A shake correction device comprising:
a vibration detector;
a shake correction mechanism that corrects a shake of an image captured by an imaging element; and
a processor,
wherein the processor is configured to
  perform a first control of driving the shake correction mechanism based on vibration information output from the vibration detector, and
  in response to a first state being detected based on the vibration information, hold a position of a movable unit of the shake correction mechanism at a position based on the first state at at least a timing of finish of the first state, and
wherein the first state is a state where a period of change in angular velocity included in the vibration information output from the vibration detector exceeds a threshold value.

13. An imaging apparatus comprising:
the shake correction device according to claim 1; and
the imaging element.

14. A shake correction method comprising:
performing a first control of driving a shake correction mechanism that corrects a shake of an image captured by an imaging element based on vibration information output from a vibration detector; and
predicting, in response to a first state being detected based on the vibration information, the vibration information to be output from the vibration detector at a timing of finish of the first state,
wherein the first state is a state where a period of change in angular velocity included in the vibration information output from the vibration detector exceeds a threshold value.

15. A shake correction method comprising:
performing a first control of driving a shake correction mechanism that corrects a shake of an image captured by an imaging element based on vibration information output from a vibration detector; and
holding, in response to in a first state being detected based on the vibration information, a position of a movable unit of the shake correction mechanism at a position based on the first state at at least a timing of finish of the first state,
wherein the first state is a state where a period of change in angular velocity included in the vibration information output from the vibration detector exceeds a threshold value.

16. A non-transitory computer readable medium storing a shake correction program causing a processor to execute:
performing a first control of driving a shake correction mechanism that corrects a shake of an image captured by an imaging element based on vibration information output from a vibration detector; and
predicting, in response to a first state being detected based on the vibration information, the vibration information to be output from the vibration detector at a timing of finish of the first state,
wherein the first state is a state where a period of change in angular velocity included in the vibration information output from the vibration detector exceeds a threshold value.

17. A non-transitory computer readable medium storing a shake correction program causing a processor to execute:
performing a first control of driving a shake correction mechanism that corrects a shake of an image captured by an imaging element based on vibration information output from a vibration detector; and
holding, in response to a first state being detected based on the vibration information, a position of a movable unit of the shake correction mechanism at a position based on the first state at at least a timing of finish of the first state,
wherein the first state is a state where a period of change in angular velocity included in the vibration information output from the vibration detector exceeds a threshold value.

* * * * *